United States Patent [19]
Gill et al.

[11] Patent Number: 6,058,738
[45] Date of Patent: *May 9, 2000

[54] METHOD OF FORMING GLASS HAVING INTEGRAL POLARIZING AND NON-POLARIZING REGIONS

[75] Inventors: Sherry Jeanne Gill, Westminster, S.C.; Ahmad Sarhangi, Painted Post, N.Y.

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/173,892

[22] Filed: Oct. 16, 1998

Related U.S. Application Data

[60] Provisional application No. 60/063,741, Oct. 17, 1997.

[51] Int. Cl.[7] .............................. C03C 15/00; C03C 8/24; C03C 17/04; C03B 37/00
[52] U.S. Cl. ........................ 65/30.1; 65/30.11; 65/32.1; 65/32.3; 65/32.4; 65/33.6; 427/163.1; 427/165; 427/269; 427/270; 427/271; 427/272; 427/282; 427/287
[58] Field of Search ..................... 501/13, 22; 65/30.1, 65/30.11, 32.1, 32.3, 32.4, 33.6; 427/163.1, 165, 168, 169, 269, 270, 271, 272, 282, 287

[56] References Cited

U.S. PATENT DOCUMENTS

| | | | |
|---|---|---|---|
| 3,899,314 | 8/1975 | Siegmund | 65/23 |
| 3,961,120 | 6/1976 | Hearn et al. | 428/210 |
| 4,190,451 | 2/1980 | Hares et al. | 106/47 |
| 4,269,617 | 5/1981 | Shibuya et al. | 65/43 |
| 4,304,584 | 12/1981 | Borrelli et al. | 65/30.11 |
| 4,479,819 | 10/1984 | Borrelli et al. | 65/30.11 |
| 5,679,500 | 10/1997 | Matsuo et al. | 430/314 |

FOREIGN PATENT DOCUMENTS

| | | |
|---|---|---|
| 97/35812 | 10/1997 | WIPO . |
| 98/47832 | 10/1998 | WIPO . |

*Primary Examiner*—Stanley S. Silverman
*Assistant Examiner*—Jacqueline A. Ruller
*Attorney, Agent, or Firm*—Angela N. Nwaneri

[57] ABSTRACT

Method of making polarizing glass having integral polarizing and non-polarizing regions is disclosed. The method involves applying a protective glass/frit material capable of blocking reducing gas to the surface of the glass to form a desired pattern, exposing the glass to a reducing gas atmosphere to render unprotected glass polarizing, and removing the protective glass/frit material to reveal underlying non-polarizing regions.

13 Claims, No Drawings

METHOD OF FORMING GLASS HAVING INTEGRAL POLARIZING AND NON-POLARIZING REGIONS

This application is based upon the provisional application Ser. No.60/063,741, filed Oct. 17, 1997, which we claim as the priority date of this application.

BACKGROUND OF THE INVENTION

Well known methods exist for making polarizing glass. One such commercial method is by reducing silver or lead ions in a glass to the atomic state. For certain recent applications it has become desirable to provide glass having both polarizing and non-polarizing regions integral thereto. While methods have been known for many decades for making polarizing glass, until recently, it had not been widely known that polarizing and non-polarizing glass regions can be made integral to a single glass surface. Two such techniques have recently been disclosed in copending, co-assigned U.S. application Ser. Nos. PCT/US 97/04870 and 60/044,790 (both herein incorporated by reference), which have suggested different approaches for forming polarizing regions in non-polarizing glass by photolithographic methods as well as by ion-exchange methods.

The above recent techniques notwithstanding, there continues to be a need for simpler and improved methods of producing polarizing/non-polarizing glass. Accordingly, it is the object of this invention to provide a new and improved method for making polarizing glass regions in non-polarizing glass.

SUMMARY OF THE INVENTION

Briefly, the invention relates to a method of forming glass having polarizing and non-polarizing regions integral to the glass by providing a phase-separable, copper and silver-containing glass, said glass being phase separable by virtue of the presence therein of silver-halide particles; elongating the glass under stress such that the particles are elongated and aligned in the direction of the stress; applying a protective material (frit barrier layer) to the surface of the glass to form a pattern of protected and unprotected regions, the frit material being capable of blocking gases, in particular hydrogen to prevent such gas from contacting the underlying glass; sintering the frit material; subjecting the glass to a reducing gas atmosphere to reduce the reducible phase in the unprotected regions of the glass and to thereby render the glass in said regions polarizing; and removing the glass frit material from the protected regions to reveal the underlying non-polarizing glass. The resulting glass is characterized by a pattern of polarizing and non-polarizing regions.

DETAILED DESCRIPTION OF THE INVENTION

Any glass containing a reducible elongated phase such as, $AgCl_xBr_{1-x}$, $CuCl_xBr_{1-x}$, where x has a value between 0 and 1, or phase separated Pb-borate glass can be used for the present invention. Other useful reducible phases include, AgI, CuI and Cu/Cd halides. One example of such glass is Corning's Photogray-Extra® glass described in U.S. Pat. No. 4,190,451, having a composition in weight percent on the oxide basis, of 0–2.5%, $Li_2O$, 0–9% $Na_2O$, 0–17% $K_2O$, 0–6% $Cs_2O$, 8–20% $Li_2+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio of alkali metal oxide:$B_2O_3$ ranging between about 0.55–0.85, where the composition is essentially free from divalent metal oxides other than CuO, and the weight ratio Ag:(Cl+Br) ranges about 0.65–0.95.

To render such glass polarizing, the glass is first stretched or elongated under stress such that the silver or copper halide particles are stretched or elongated and aligned in the direction of the stress. As described in the co-pending applications referenced above, the stretched glass containing elongated particles is then subjected to a reducing gas treatment, an ion-exchange bath, or exposed to ultraviolet light and heat, to effect a reduction of the silver-halide particles and render the glass polarizing.

We have discovered a relatively simple approach to forming a pattern of polarizing and non-polarizing regions on the glass by use of a frit glass slurry. Useful glass frits for the invention include borates and phosphates, in particular, borosilicate and borophosphate glasses such as Corning's CF 1416 glass frit having a composition in weight percent based on the oxides of: 10 wt. % $B_2O_3$, 10 wt. % $Al_2O_3$, 7 wt. % $SiO_2$, and 73 wt. % PbO. For best results, the frit glass preferably has a coefficient of thermal expansion in the range of $4\times10^{-6}$ to $9\times10^{-6}$. In general, the selected glass frit should have a coefficient of thermal expansion that is as close as possible to that of the underlying polarizable glass.

In one illustrative example of this embodiment, silver-containing glass having a phase separable silver halide particles is coated with a glass frit/photoresist mixture which is applied to the glass surface using any practical method such as by spraying, stencil, doctor knife coating, screen printing, spin or dip coating. Preferably, the slurry should exhibit good flow viscosity, and be capable of forming a coating of uniform thickness with little or no pinholes. The coated glass is then dried and exposed to ultraviolet radiation through a mask containing the desired pattern of polarized/non-polarized glass. After exposure, the glass is developed to remove either the exposed or non-exposed frit material (depending on whether a positive or negative photoresist is used), and heated to sinter the remaining glass frit materials. In a negative acting system, those areas of the photoresist which are exposed to ultraviolet light become insoluble in the developer solution so that after the unexposed areas have been developed, a negative image of the original pattern is obtained. After the frit layer is sintered, the glass is subjected to a reducing gas treatment to reduce silver ions to their atomic state and thereby polarize the glass. The sintered frit material is then removed by any appropriate method such as by acid etching to reveal the underlying non-polarized glass. The resulting glass is thus characterized by a pattern of polarized and non-polarized glass regions.

Examples of useful photoresist materials for forming the frit glass slurry include certain materials made by Shipley Inc., of MA, and sold by Microelectronic Chemical Corporation, under the designations, S-1818, STR-1045, and S-1805.

Any solvent or solution which is capable of dissolving only the unreacted slurry can be used to develop the glass. Preferably, the development liquid is an aqueous solution such as dilute aqueous carbonate solutions commonly used in the printed circuit-board industry, for example, aqueous sodium carbonate solution.

According to another embodiment, a mixture of frit and polymeric binder is applied to selected regions of the glass surface to form a barrier layer in such regions. After applying the frit/polymer mixture to the surface of the glass to form the desired structure, it is air dried, followed by heating at 380° C. for 15 minutes to remove the binder and excess water. The samples are then fired at a temperature in the range of 420–500° C. (depending on the frit composition), for about 15 to 30 minutes to sinter the frit.

Prior to sintering the frit thickness may be in the range of 20 to 60 µm. After the frit is sintered to form a glass layer, the thickness of the glass is generally in the range of 40 to 60% of the frit thickness.

After sintering, the glass is subjected to a reducing gas treatment to polarize the unprotected regions of the glass. The barrier layer is then removed to reveal underlying non-polarizing regions and to produce a glass having a pattern of polarizing and non-polarizing regions integral thereto. In this embodiment, the pattern of barrier material can be formed by any appropriate method. In a preferred embodiment the mixture of frit and polymer material is applied by spray, screen, and stencil printing methods onto the glass surface through a plate having the desired pattern.

The glass frit/binder mixture preferably includes at least 40 wt % glass frit, 5 to 10% binder, the balance being water. Depending on the type of binder, it may be beneficial to add other solvents such as alcohols in order to increase the solubility of binder. Also, for improved wettability, a surfactant may be added. Generally, the lower the frit content, the lower the viscosity and the lower the fired thickness of the barrier layer.

Examples of useful binders and adhesives for making the frit slurry include Aquazole® a poly (2-ethyl-2-oxazoline) available from Polymer Chemistry Innovations, AZ, and amyl acetate nitrocellulose solutions.

EXAMPLES

1. To demonstrate the gas-blocking effect of the frit/binder of the invention, ten grams of frit glass Code 1416 purchased from Ferro, Inc. was mixed with 25 cm$^3$ of amylacetate nitrocellulose (binder) and the mixture was left on roller mixture overnight for proper mixing. Several samples of Corning's Glass Code 8111 (a phase separable, copper and silver-containing glass characterized by elongated silver halide particles, also available from Corning Incorporated, Corning, N.Y.) were cut to 1"×3" dimensions. A small region measuring 1"×0.5" was masked off in each sample using a tape. The unmasked regions of the glass samples were then dip-coated with the frit/binder mixture. After coating, the samples were air dried at room temperature, the tape was removed and the glass was then placed in an oven and heated at 380° C. for 15 minutes to remove the binder. Finally, the samples were fired to a temperature of 500° C. at the rate of about 10° C./minute and held at 500° C. for 15 minutes. The heated frit flowed and formed a glass layer having a thickness in the range of 12–15 µm on the stretched glass surface. After the frit layer was formed on the glass surface, the glass samples, along with several control samples (uncoated Code 8111 glass), were heated in a hydrogen reduction furnace for six hours.

After the hydrogen treatment the frit layer was removed by acid etching. We observed that the glass underlying the coated regions of the samples were not affected by the hydrogen treatment as they retained the original color of the Code 8111 glass, indicating the frit glass was effective in blocking the reducing gas (in this case, hydrogen), and from preventing the gas from contacting the underlying glass. The unprotected glass region was observed to be polarized by the hydrogen treatment.

2. In the following example, we illustrate one embodiment of the invention in which a pattern of polarizing glass is formed on a non-polarizing glass by means of a photolithographic process.

(a) Slurry. A 250 ml Nalgene bottle was duct-taped to prevent the entrance of UV light, and 10 pieces of ceramic media mixing balls were placed in the bottom of the bottle; 140 g of Corning Glass Code CF1416 frit glass powder was weighed into the bottle; 70 g of SC1805 Shipley photoresist was measured and added to the frit in the yellow light clean room; the cap was sealed with duct tape and the mixture placed on the roller mixture overnight to obtain a uniform slurry mixture.

(b) Coating/Drying. Sample spraying was carried out in a clean room using an air regulator set at 30 psi and a small Bink spray gun. The glass samples were coated with a single pass spray of the frit glass slurry of 2(a) above. The sprayed samples were dried in a 90° C. oven for 15 minutes.

(c) UV Exposure. Three frit glass-sprayed samples were exposed to UV light for 5, 10, and 15 seconds respectively. The samples exposed for 15 seconds gave the most satisfactory results. Precise, well-rounded, sharp-edged circles were evident in the pattern at 5× magnification. After exposure, the samples were developed using a 5:1 mixture of deionized water/351 Shipley Developer. The 5 and 10 second samples required scrubbing to remove exposed frit/photoresist. After development, the samples were rinsed with deionized water, air dried, and then dried in a 90° C. oven for 15 minutes. Dektak measurements showed an average pattern thickness of about 10 microns. Finally, the backs or reverse sides of the samples were sprayed with about 10 microns thick frit glass.

(d) Sintering. Sintering was done by placing samples in a room temperature oven, ramping at 10° C./minute to a top temperature of 500° C. for 15 minutes, then ramped down to room temperature.

(e) Hydrogen Treatment. The sintered samples were subjected to a hydrogen environment for 5.5 hours at 3 atmospheres to reduce the exposed regions of the glass and thereby polarize such regions. After the reduction process, the samples were cleaned in 20% acetic acid to remove the frit glass. Microscopic inspection of the samples showed a pattern of well rounded non-polarizing circles.

The following examples illustrate the use of silk screen and stencil printing techniques to produce 2.45 mm diameter frit images and solid frit on clear glass slides for the purpose of blocking hydrogen in the final firing stage.

Silk Screen Dot Printing Process a) a dark field, quartz glass with a 90 dot pattern was used as a working master to photographically produce a film positive which was then used to produce a 400 mesh stainless steel silk screen on a 12" by 12" support frame;

b) the silk screen was coated with 10 micron thickness of HP emulsion;

c) two media were produced with frit for subsequent printing of the pattern through the silk screen; the first medium was produced using pine oil, and then roll-milled with CF-1416 frit to a final viscosity of about 80,000 cps while the second medium, IP-9025W, available from Heraeus Corporation was used at a viscosity of 96,000 cps. IP-9025W is essentially a mixture of terpineol, bi-butyl phthalate, and glass frit.

d) the patterns were printed with a screen printer using the 400 mesh stainless steel silk screen and the two printing media. The screen printer was fitted with a 60 durometer squeegee and flood bar and operated at a speed of 2.5 inches per second.

e) the clear glass samples were then fired at 500° C. and evaluated.

Silk Screen Solid Printing Process a) a rubylith master positive with a pattern of 36 mm by 76 mm was produced;

b) a 400 mesh stainless steel silk screen having the same solid pattern was silk screen printed on clear glass with a screen printer using CERDEC 479 oil with CF-1416 frit, and IP-9026W media as described above. The pattern was also screen printed using a mixture of Shippley STR-1045 Photo Resist with CF-1416 frit and exposed with a UV source to produce the dot pattern by photolithography;

c) the clear glass was then fired at 500° C. and evaluated.

Stencil Printing Process a) dot pattern was digitized on a computer file which was used to laser etch a 0.002" and 0.003" thick stencil;

b) several media were produced using (i) Heraeus IP-9025W at 96,000 cps, (ii) Heraeus IP-9026 at 112,000 cps and (iii) Heraeus IP-9039 at 220,000 cps;

c) the pattern was stencil printed on clear glass and Corning's Polarcor® glass with a printer fitted with a stainless steel squeegee and flood bar with operating speeds of 1 to 5 inches per second;

d) the samples were then fired at 500° C. and evaluated for print quality.

We claim:

1. In a method of forming glass having polarizing and non-polarizing regions integral thereto, by:

a) providing a phase-separable, copper and silver-containing glass, said glass being phase separable by virtue of the presence therein of silver-halide particles;

b) elongating the glass under stress such that the particles are elongated and aligned in the direction of the stress;

c) applying a protective material to the surface of the glass to form a pattern of protected and unprotected regions;

d) subjecting the glass to a reducing gas atmosphere to reduce the reducible phase in the unprotected regions of the glass and thereby render the glass in said regions polarizing; and (e) removing the protective material from the glass to reveal underlying non-polarizing glass;

the improvement being that the protective material is applied in the form of a glass/frit mixture, wherein said material is capable of blocking a reducing gas.

2. The method of claim 1 further comprising the step of sintering the protective material prior to step (d).

3. The method of claim 2 wherein the protective material is sintered at a temperature in the range of 420 to 500° C.

4. The method of claim 3 wherein the protective material is sintered in the presence of hydrogen and oxygen.

5. The method of claim 1 wherein the phase-separable glass comprises in weight percent on oxide basis, of: 0–2.5%, $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio of alkali metal oxide:$B_2O_3$ ranging between about 0.55–0.85, where the composition is essentially free from divalent metal oxides other than CuO, and the weight ratio Ag:(Cl+Br) ranges about 0.65–0.95.

6. The method of claim 1 wherein the protective material is selected from the group consisting of glass/frit and binder; photoresist and glass/frit; and combinations thereof.

7. The method of claim 6 wherein the glass frit comprises low-forming temperature glass frits selected from the group consisting of borosilicates, phosphates and borophosphates.

8. The method of claim 7 wherein the glass frit is selected from the group consisting of lead-borosilicates, lead-zinc-phosphates, and lead-zinc-borates.

9. The method of claim 8 wherein the glass frit comprises in weight percent based on oxides of: 10 wt. % $B_2O_3$, 10 wt. % $Al_2O_3$, 7 wt. % $SiO_2$, and 73 wt. % PbO.

10. The method of claim 1 wherein the protective material comprises, ZnO and/or CuO, in combination with a binder, and/or $B_2O_3$.

11. The method of claim 10 wherein the binder is selected from the group consisting of poly(2-ethyl-2-oxazoline) and amylacetate nitrocellulose.

12. The method of claim 1 wherein the protective material is removed by acid etching.

13. The method of claim 1 wherein the protective material comprises a mixture of glass frit and photoresist.

* * * * *